(12) United States Patent
Casper et al.

(10) Patent No.: US 10,507,547 B2
(45) Date of Patent: Dec. 17, 2019

(54) DEVICE FOR INDUCTIVE HEATING OF A COMPONENT

(71) Applicant: MTU Aero Engines AG, Munich (DE)

(72) Inventors: Johannes Casper, Munich (DE); Herbert Hanrieder, Hohenkammer (DE)

(73) Assignee: MTU Aero Engines AG, Munich (DE)

( * ) Notice: Subject to any disclaimer, the term of this patent is extended or adjusted under 35 U.S.C. 154(b) by 232 days.

(21) Appl. No.: 15/596,480

(22) Filed: May 16, 2017

(65) Prior Publication Data

US 2017/0341182 A1 Nov. 30, 2017

(30) Foreign Application Priority Data

May 25, 2016 (EP) ..................... 16171248

(51) Int. Cl.
 *B23K 26/342* (2014.01)
 *B33Y 30/00* (2015.01)
 (Continued)

(52) U.S. Cl.
 CPC .......... *B23K 26/342* (2015.10); *B22F 3/1055* (2013.01); *B23K 26/144* (2015.10); *B23K 26/702* (2015.10); *B33Y 30/00* (2014.12); *B33Y 40/00* (2014.12); *H05B 6/10* (2013.01); *H05B 6/101* (2013.01); *H05B 6/36* (2013.01); *H05B 6/44* (2013.01); *B22F 2003/1053* (2013.01); *B22F 2003/1056* (2013.01)

(58) Field of Classification Search
 CPC .. B23K 26/342; B23K 26/144; B23K 26/702; B33Y 30/00; B33Y 40/00; B22F 3/1055; B22F 2003/1053; H05B 6/101; H05B 6/36; H05B 6/44

USPC ....... 219/76.1; 200/51.07; 439/32, 472, 529, 439/890, 919

See application file for complete search history.

(56) References Cited

U.S. PATENT DOCUMENTS 5,001,319 A * 3/1991 Holmstrom ............ B23K 13/02
                                                                156/274.2
5,993,222 A * 11/1999 Nicolette ........... H01R 13/2464
                                                                 191/59.1

(Continued)

FOREIGN PATENT DOCUMENTS

| AT | 365027 B | 12/1981 |
| DE | 202009001136 U1 | 5/2009 |
| WO | 2014/057692 A1 | 4/2014 |

*Primary Examiner* — Craig M Schneider
*Assistant Examiner* — David R Deal
(74) *Attorney, Agent, or Firm* — Barlow, Josephs & Holmes, Ltd.

(57) ABSTRACT

The invention relates to a device for inductive heating of a component, having a component placement unit for the component, an induction coil, with which the component can be heated inductively, at least in regions, an electrical lead for the induction coil, and a positioning unit, at which the induction coil is arranged in such a way that it can be brought into different relative arrangements with respect to the component placement unit by way of the positioning unit, wherein the electrical lead is guided over a contact, which is formed by contact surfaces that rest against each other and are shifted in position in relation to each other in the contact position when the induction coil is shifted in position by means of the positioning unit.

15 Claims, 3 Drawing Sheets

(51) Int. Cl.

| | |
|---|---|
| *B33Y 40/00* | (2015.01) |
| *B23K 26/144* | (2014.01) |
| *B23K 26/70* | (2014.01) |
| *B22F 3/105* | (2006.01) |
| *H05B 6/10* | (2006.01) |
| *H05B 6/36* | (2006.01) |
| *H05B 6/44* | (2006.01) |

(56) References Cited

U.S. PATENT DOCUMENTS

| | | | | |
|---|---|---|---|---|
| 6,170,967 | B1* | 1/2001 | Usher | F21V 23/06 |
| | | | | 200/227 |
| 6,399,929 | B1* | 6/2002 | Hanton | H05B 6/104 |
| | | | | 219/632 |
| 6,548,791 | B2* | 4/2003 | Kistersky | B21D 26/14 |
| | | | | 219/603 |
| 9,636,769 | B2* | 5/2017 | Goehler | B22F 3/1055 |
| 2003/0066829 | A1* | 4/2003 | Kansa | F23G 5/027 |
| | | | | 219/630 |
| 2010/0072192 | A1* | 3/2010 | Hirota | H05B 6/365 |
| | | | | 219/647 |
| 2014/0363327 | A1* | 12/2014 | Holcomb | B22F 3/1017 |
| | | | | 419/53 |
| 2015/0060422 | A1* | 3/2015 | Liebl | B23K 26/08 |
| | | | | 219/121.78 |
| 2015/0273560 | A1 | 10/2015 | Pilon et al. | |
| 2016/0194233 | A1* | 7/2016 | Van Pelt | C03B 19/00 |
| | | | | 65/32.4 |
| 2016/0258045 | A1* | 9/2016 | Carter, Jr. | B23K 26/034 |
| 2016/0368052 | A1* | 12/2016 | Jakimov | B22F 3/1055 |

* cited by examiner

DEVICE FOR INDUCTIVE HEATING OF A COMPONENT

BACKGROUND OF THE INVENTION

Technical Field

The present invention relates to a device for inductive heating of a component.

Prior Art

The inductive heating of components can be of interest, for example, as supportive of additive manufacturing methods. Said methods not only enable a rapid buildup of prototypes, but also enable the production of components that are difficult to manufacture in other ways owing to their geometry, for example, or components having certain material properties. The buildup occurs layer by layer, and it is also possible to create geometries that would not be accessible by a casting technology method. In the layered buildup, a powdered component material is deposited sequentially layer by layer. After the deposition of a layer, said layer is irradiated selectively with a laser, for example, and thereby solidified in a desired region (for example, by fusion or sintering). Subsequently, the next powder layer is deposited and the component geometry that is to be produced is correspondingly solidified in regions. As discussed in detail below, this operation can be supported by inductive heating and in this respect illustrates a preferred field of application, which, however, is not intended to limit the subject in terms of its generality.

SUMMARY OF THE INVENTION

The present invention is based on the object of presenting an especially advantageous device for inductive heating of a component.

In accordance with the invention, this object is achieved by the features discussed in detail below.

Preferred embodiments are presented in the dependent claims and in the entire disclosure, with the description not always distinguishing in detail between the device and method aspects or the use aspects; in any case, the disclosure is to be read implicitly in terms of all claim categories.

The induction device according to the main claim has an induction coil, with which a component can be heated inductively. In the case of additive manufacture, it is possible to prevent cracking in the component due to temperature gradients, for example, by inductively heating the component during its production (in addition to the actual irradiation with a laser, for example). This is a preferred field of application of an induction device described herein, although an inductive heating may also be of interest, for example, in the welding of materials that are difficult to weld, such as, for instance, in laser welding.

In the induction device according to the invention, the induction coil is arranged at a positioning unit, with which the induction coil can be brought, preferably in an automated manner, into different relative arrangements in relation to a component placement unit, at which the component is arranged in application. The positioning unit enables a positioning and hence adaptation of the inductive heating to the component geometry or to the progress of processing. For operation of the induction coil, said coil is or will be connected to a resonant circuit via electrical leads, for example, so that an alternating voltage can be applied to it.

In accordance with the invention, such an electrical lead of the induction coil is guided over a contact that forms contact surfaces that rest against each other and can be shifted in place in relation to each other in the contact position when the induction coil is shifted in place in the different relative arrangements. The electrical contact, via which the electrical lead to the movable induction coil is created, is therefore a sliding contact, for example. Initial tests in this field have focused, in contrast, on connecting the induction coil via a flexible, bendable copper braid or so-called "hot cable." On account of the relatively large powers to be transmitted, however, the lead must have a certain minimum cross section. However, it was found that appropriate copper braids or cables have a relatively short service life under the load in question, that is, under the repeated bending that occurs when the induction coil is shifted in place. The large cross section of the braid reduces the flexibility and increases the material load during bending.

In contrast, by way of the present approach of creating the contact with contact surfaces that are shifted in place in relation to each other, it is also possible to design the other lead parts rigidly, for example. Wear can be reduced and service life increased, for example, thereby helping to reduce maintenance effort and costs. On the other hand, it is possible in this way also to create relatively large contact surfaces and hence to design the electrical lead for greater powers as well.

The contact surfaces of the contact can, in general, also be formed, for example, from an electrically conductive plastic or even paper; preferably, however, at least one of the contact surfaces is formed from a metal. It may also be preferred for the contact surfaces to be formed from two materials of different hardness, such as, for example, copper and graphite. One contact surface can be formed from the relatively movably guided lead part or else from a coating of the lead part in the region of the contact. For example, a contacting brush can also form the contact surface; that is, the contact can also be a brush contact. Preferably, however, a continuous material forms the contact surface(s).

In general, "a"/"an" is to be read as an indefinite article in the scope of the disclosure, that is, unless explicitly stated otherwise, always also as "at least one." As will become clear below in detail, the electrical lead can therefore also be guided, for example, over a plurality of contacts, each constructed as a kind of sliding contact, thereby making possible correspondingly more complex patterns of movement for the induction coil. Furthermore, for reasons of simplicity, reference is also made, first and foremost, to "a" or "the" lead, although obviously two leads, each guided over at least one corresponding contact, are preferred for the induction coil.

"Induction coil" is understood to mean, quite generally, any conductor geometry that makes possible an inductive heating. In a simple case, this could also involve merely a conductor loop, although an arrangement with a plurality of turns (at least two) is also possible, which can be arranged in the form of a cylindrical coil or, preferably, a flat or pancake coil. Possible upper limits to the number of turns can, for example, be at most 50, 40, 30, 20, 10, or 5 (increasingly preferred in the given sequence). The induction coil is preferably cooled with water, for example, or also with a special coolant fluid or with process gas. To this end, the induction coil can have a hollow design, for example; that is, it can be provided with a cooling channel in its interior. Regardless of the details thereof, the cooling medium is preferably conveyed via a flexible conduit system (with forward flow and return flow), that is, through hoses, for example.

In general, the "component" can be an already finished component, which, for example, is only further annealed inductively; however, the term may also be read as referring just to a subregion of a component that is finished only after further processing, such as, for example, a processing by welding. It is also possible, in particular, to arrange a semifinished article as the component on the component placement unit. Furthermore, especially in the context of additive manufacture, the term "component" can also be used for a component in the process of being created, that is, for said component during its buildup layer by layer.

The "component placement unit" can, for example, be a platform on which the component is placed, in particular during additive manufacture, when the placement unit is designed as a powder bed holder (see below for details). On the other hand, "component placement unit" is also to be understood as a holder at which the component can be held in a force-fitting manner during the inductive heating. In general words, the component placement unit serves for positioning of the component and therefore defines its position, at least within certain limits; for this reason, it serves as a reference for shifting the induction coil in position by means of the positioning unit.

In a preferred embodiment, the positioning unit has a guide part and a mobile part movably guided on it, with the induction coil being arranged on the latter part and preferably being fastened to it. The guide part and the mobile part can be moved in relation to each other via a bearing, with the induction coil being brought into different arrangements in relation to the placement unit and thus the component in the course of this guided movement.

In a preferred embodiment, the guide part and the mobile part are brought together via a slide bearing. In order to improve the sliding ability, a lubricant, for example, can be introduced into the bearing, said lubricant being a graphite-based lubricant, for instance, or else a contact grease. This may also generally be preferred, that is, also when the bearing is not designed as a sliding bearing, for example, but rather as a roller bearing.

In a preferred embodiment, a contact area of the contact and a sliding surface of the sliding bearing coincide at least in part; preferably, the sliding surface includes the contact area. The contact area is the area in which the contact surfaces actually rest against each other in each relative arrangement of the induction coil; in contrast to this, a contact surface is the surface provided overall when all relative arrangements of contact are regarded. In the sliding surface of the sliding bearing, the guide part and the mobile part are supported against each other (in each relative arrangement of the induction coil). In this embodiment, therefore, a surface utilized for bearing of the movement is utilized at the same time as an electrical contact area. This embodiment makes it possible, for example, to realize a space-saving buildup, which can offer advantages not only in the case of additive manufacture in a process chamber (see below for details) in view of the limited spatial relationships there.

In general, a conductive paste can be introduced into the contact in order to diminish any contact resistance; in the case of a combined sliding bearing/brush contact, said conductive paste can, at the same time, also fulfill a lubricating function (see above). Alternatively to the sliding bearing, a roller bearing is also conceivable in general for bearing of the guide part and the mobile part and can also form, preferably at the same time, the electrical contact. The relative shift in position of the contact surfaces in the contact position could accordingly also be achieved by a roller contact. Preferably, however, the contact surfaces rest flatly against each other and slide against each other in the surface contact (referred to as a sliding contact or else as a brush contact).

The guide surface that includes the contact area is not necessarily the sole guide surface of the bearing. An additional guide surface can also be provided, which limits another degree of freedom of the relative movement; for example, this additional guide surface can then also be designed so as not to be electrically conductive. Thus, for example, the guide part and the mobile part can each be designed so as to be able to rotate at a common axis, which, designed as an insulator, imparts no electrical contact between the two parts. The electrical contact could then be realized by resting the guide part and the mobile part directly against each other, with the corresponding contact area then limiting the ability of the two parts to shift in position along the axis and, at the same time, representing a sliding surface (in which the two parts slide against each other when they are rotated in relation to each other around the axis); compare also the exemplary embodiment in accordance with FIG. 5 with description of the illustration (referred to there as a "rotating conductor").

In the following, two different possibilities for bearing of the guide part and movement part will now initially be described further in detail; said part can be designed in principle as a pivot bearing or linear bearing. As already mentioned, the electrical lead can then be guided further over a plurality of contacts; in particular, therefore, combinations of bearings that can pivot or shift in position or of a plurality of bearings of the same type are also possible.

A preferred embodiment relates to a pivot bearing in which the guide part or the mobile part is an axis, at which the two parts are designed so as to be able to rotate in relation to each other. In this case, the axis has a conductor part, which forms one of the contact surfaces of the contact, preferably a conductor part that is continuous over the range of rotational angles. If the axis is cylindrical in form, is it possible in a simple case, for example, for an electrically conductive solid cylinder, which is made of metal, for instance, to form the axis and, at the same time, the conductor part. In general, the axis can also be the mobile part with the induction coil on it; preferably, the axis is the guide part and a carriage, as mobile part, is arranged on it rotatably.

As already mentioned, the induction coil is preferably connected via two leads; preferably, the sliding surface of the sliding bearing correspondingly includes two contact areas, namely one for each lead.

Specifically, in the case of a pivot bearing, the axis could then have two conductor parts in such a way that one of them forms the core part of the axis and the other forms a sleeve part. If the core part and the sleeve part are insulated from each other, they can each be associated with another lead. The carriage can have two contact elements, which are likewise electrically insulated from each other, one of which forms a contact area with the sleeve and the other of which forms a contact area with the core part. To this end, the core part can extend axially beyond the sleeve part, for example, and the contact area is created there. However, it is also possible for the sleeve part and an insulator to be interrupted during rotation (preferably during complete rotation), with one of the contact elements of the carriage then resting against the core part in the region of this interruption and, in this case, being preferably separately insulated from the sleeve part (compare FIG. 5 for illustration).

In a preferred embodiment, the mobile part and/or the guide part are or is a rail. Preferably, one part is a rail and the other part is a carriage guided on it, even though, in general, two rails that are brought together are also possible. This embodiment therefore relates ultimately to a linear bearing, with it being possible for the track of movement also to be bent/curved in general, although it is preferably a straight line. In general, furthermore, a combination of translation and rotation can also be realized in the same bearing (for instance, when the carriage that is guided so as to rotate at the axis, as described above, can additionally be shifted in position along said axis); preferably, however, the linear bearing makes possible an exclusively translational shift in position.

Regardless of the details thereof, the rail has a conductor part along the track of movement, which makes possible the bearing, preferably a solid continuous conductor part along the track of movement. Said conductor part forms one of the contact surfaces of the contact. Preferably, the rail also has a second conductor part, which is associated with the other lead and likewise forms a contact surface (for the contact thereof). The first conductor part and the second conductor part can be provided such that they are spaced apart via a gas, in particular air, for example, and thus insulated electrically or thermally from each other. Preferably, however, a solid material, such as, for example, a ceramic, can also be arranged in between.

In a preferred embodiment, the rail is provided with a carriage that is guided on it and has a contact element as part of the electrical lead. The conductor part of the rail then forms one of the contact surfaces and the contact element of the carriage forms the other. The sliding surface, which the rail and carriage have against each other, is preferably constant over the entire track of movement (in distinction, for example, to two rails that are brought together); the same preferably holds for the contact area(s).

In general, the rail and/or the carriage or else the above-mentioned axis and/or the carriage guided on it can be cooled; that is, a cooling channel or cooling channels, through which a coolant fluid or a process gas is conveyed, can pass through them, for example. A cooling can help to prevent any thermal expansions or differences in expansion. Thus, for example, the mobility of the carriage can be retained or any deterioration/breaking of the electrical contact can be countered.

In a preferred embodiment, the carriage embraces the rail at least in part; therefore, the carriage and rail are held together in a form-fitting manner in the manner of a profiled rail guide. This also relates to sectional planes lying perpendicular to the track of movement (each sectional place lies perpendicular to the direction of movement at a respective point on the track); that is, the carriage and rail are held together with respect to directions perpendicular to the track of movement. To this end, the carriage can also embrace the rail only partially (compare FIG. 2 for illustration) or else in full.

An arrangement composed of carriage and rail can also preferably be optimized to the extent that the two of them are pressed against each other with a spring element or a screw construction, for example, in order to create a good contact. An optimization parameter can be the sliding surface/contact surface, for example, which, depending on the power to be transmitted, is designed to be sufficiently large. The rail can ideally be designed to be as stiff as possible, thereby enabling a good guiding and also aiding to simplify the pressing of the carriage against it.

In a preferred embodiment, the carriage is the mobile part, at which the induction coil is arranged and thereby connected in an electrically conductive manner to the contact element(s). Accordingly, the rail is the guide part. In general, the guide part, preferably the rail, is not necessarily fixed in position in relation to the component placement unit, but rather it can also be designed on its part so as to be mobile. Regardless thereof, whether fixed in position or guided, a mounting of the rail at the housing of the resonant circuit is preferred. The housing contains the capacitor; an electrically functional resonant circuit then exists after exclusion of the induction coil (nonetheless, the unit with the capacitor is referred to as a "resonant circuit").

In the following, possibilities of how different bearings can be combined at a common lead so as to span different spaces of movement will now be discussed. In doing so, one rail as component will be assumed; in this case, in general, it could also be possible to realize a three-dimensional positionability solely through a combination of pivot joints.

In a preferred embodiment, the rail itself is designed so as to be able to rotate in relation to the component placement unit, with the axis of rotation and the track of movement predetermined by the rail being preferably perpendicular to each other (in general, they could also coincide; that is, the rail could be inclinable). The pivot bearing is preferably a sliding bearing, the sliding surface of which forms, at the same time, an electrical contact area, over which the electrical lead is guided. Explicit reference is made to the preceding discussions regarding possible design of a pivot bearing.

In a preferred embodiment, additionally to the first rail, a second rail is provided, with the two rails being brought together and being movable in relation to each other along a second track of movement. This second track of movement extends at an angle to the first track of movement defined by the first rail, preferably perpendicularly to it. Together, therefore, the two rails can span a two-dimensional coordinate system. Said coordinate system can be augmented by a further bearing to expand it to a three-dimensional coordinate system; for instance, it can be expanded by a pivot bearing to form a cylindrical coordinate system or it can be expanded by another (third rail) to form a three-dimensional Cartesian coordinate system.

In analogy to the above description, the second rail preferably has a conductor part along the second track of movement, said conductor part forming a contact surface of a second contact. Via this second contact, the conductor part of the first rail and that of the second rail are electrically connected to each other. A carriage can be guided on the second rail so as to be able to shift it in position, for example, and the first rail is then fastened at it in a fixed position (the conductor part of which is then connected to the contact element of the carriage in an electrically conductive manner). Analogously, a third rail could then also be integrated; therefore, the second rail could be fastened at a carriage guided on the third rail.

The invention also relates to a device for additive manufacture of a component from a powder bed, which has an induction device disclosed above. The "component placement unit" is then a powder bed holder in which, accordingly, the component is also arranged during its layer-by-layer production or in which the finished component is then arranged at the end of the manufacturing process. The induction coil can be shifted in position in relation to the powder bed holder and the component can be heated inductively with the induction coil during its production, which occurs through solidification of the powder bed in regions by irradiation.

Although, in general, a surface-irradiating source—for example, in conjunction with a masking for selection of the powder bed region to be solidified—is also conceivable, for example, a bundle-emitting beam source is preferred. The beam is moved over the powder bed (which is thus "scanned") and, in the process, the desired region can be irradiated by selective switching the beam on and off. As beam source, an electron beam source is also possible, for example. Preferably, however, a laser source, such as, for instance, a $CO_2$ laser, Nd:YAG laser, or Yb fiber laser, or else a diode laser, is possible. The additive manufacture can be, in particular, a direct metal laser sintering (DMLS) or a selective laser melting (SLM).

In the scope of the additive manufacture, the induction device according to the invention can offer special advantages insofar as the manufacture occurs in a process chamber in many cases. A lead of the induction coil that is rigid, apart from the bearing in the contact, can then offer advantages during use in protective gas atmosphere, for example. Namely, it can be simplified by sealing the process chamber, for example, when it is necessary to provide sealing not against mobile parts (for example, a copper braid), but rather against a rigid lead part.

In general, the device according to the invention for additive manufacture preferably has a coater, which can be guided movably over the powder bed holder. The powder bed can be deposited layer by layer by means of the coater; that is, a new layer can be deposited after the preceding layer has been solidified in regions by irradiation. The powder bed holder as such can be a table in the simplest case; preferably, it is a cavity that is open at the top and in which the powder bed is arranged.

In a preferred embodiment, the rail (for guiding the induction coil) is fastened to the coater itself or to a guide of the coater. In this case, the rail is fixed in position in relation to the coater or is guided movably. This can enable, for example, a space-saving integration; in addition, for example, it is also possible to reduce the effort for actuation when a collision of the conductor part and the induction coil is already prevented as a result of the arrangement. The coater and the conductor part of the rail can be insulated from each other in order to prevent any electric fields, which could interfere with a specific preheating.

In a preferred embodiment, a second induction coil is provided in addition to the first induction coil, said second induction coil on its part being movable in relation to the powder bed holder by means of a second positioning unit and its electrical lead being likewise guided over a contact according to the invention. Obviously, a further induction coil is also possible, preferably at most three. All specifications given above and in the scope of the claims for the (first) induction coil, its positionability, and its electrical lead can also be preferred for a second (further) induction coil(s). In general, it is also conceivable that induction coils divide parts of a rail system, for example; preferably, however, each induction coil has its own respective mechanical guide and separate electrical leads. Preferably, a construction of this kind can be such that any collision is forestalled just by the guide of the induction coils and can even be completely prevented.

The invention also relates to a method for the production of a component by additive manufacture with a device disclosed herein, wherein the induction coil is brought into different relative arrangements with respect to the powder bed holder by means of the positioning unit. In the process, the contact surfaces of the contact are shifted in place in the contact position in relation to each other and preferably slide against each other. The component is heated or "warmed" (the two terms are used herein synonymously) inductively at least intermittently in regions during the manufacture.

Preferably, the additively manufactured component is a component of a jet engine, such as, for example, a blade. Preferably, the inductive heating can occur particularly for the processing of materials that are difficult to weld, such as, for instance, high-alloy steel or materials that have been precipitation-hardened (for example, Al, Ni, etc.). A preheating can offer advantages also, for example, in the case of materials of high thermal conductivity (for example, Al, Cu, Ag).

BRIEF DESCRIPTION OF THE DRAWINGS

The invention will be discussed in detail below on the basis of exemplary embodiments, in which the individual features in the scope of the dependent claims can be fundamental to the invention also in other combinations and in which, moreover, no distinction is always further made between the claim categories.

Show in detail are.

DESCRIPTION OF THE INVENTION

Figure 1:
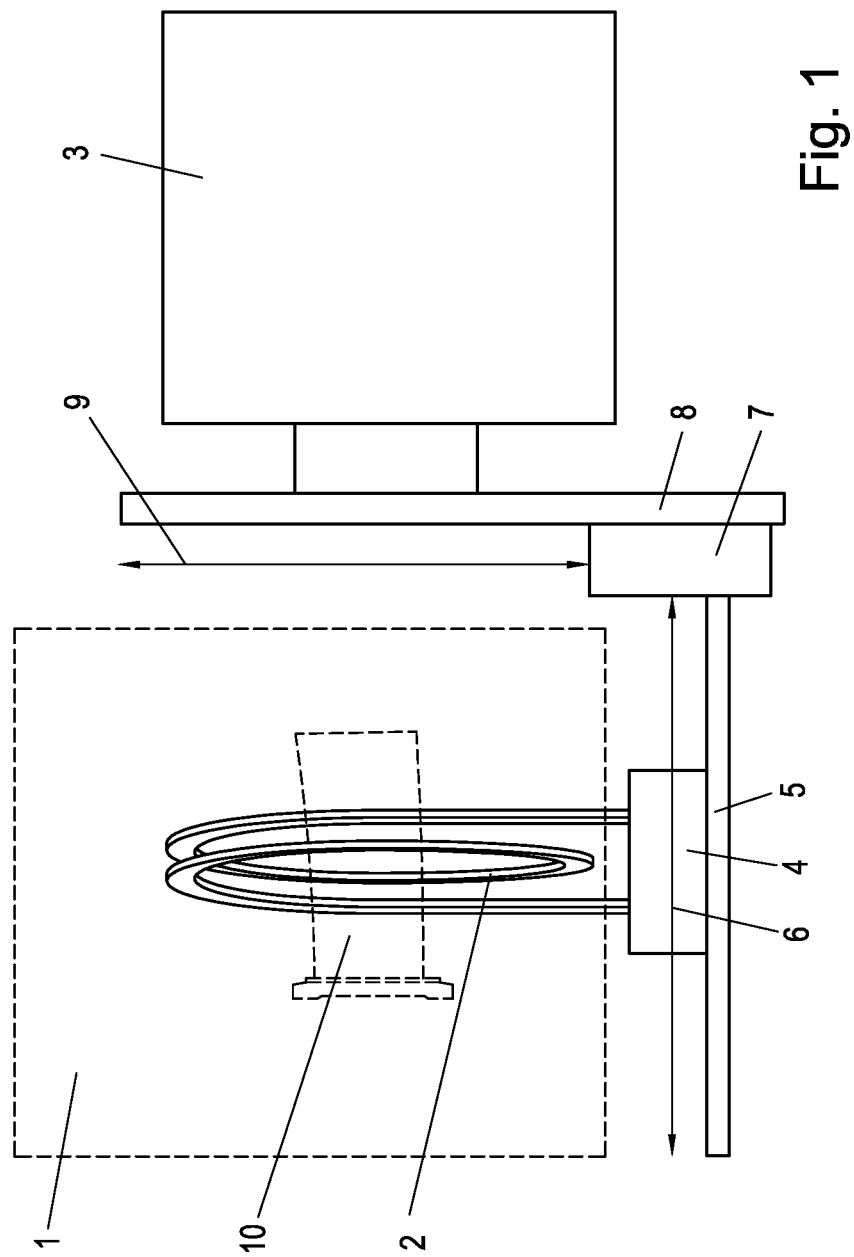
FIG. 1 is a part of a device for additive manufacture from a powder bed, including an induction device according to the invention in plan view.

An induction device according to the invention will be illustrated below in the context of the preferred integration in a device for additive manufacture of a component; in an analogous way, an integration into a welding unit would also be possible, for example. FIG. 1 shows the additive manufacturing device in plan view. The component 10, which is, in this case, a blade (for example, for a turbine) indicated by a dashed line, is built up from a powder bed layer by layer through local fusion using a fiber laser (not illustrated, but arranged in the plane of the viewer). A holder 1 for the powder bed is indicated by a dashed line in the figure. The build-up direction is perpendicular to the plane of the drawing; after fusion in regions and thus solidification of each layer, the component 10 is lowered in the plane of the drawing and hence lowered into the powder bed holder 1 and thereby covered with the next powder layer.

When the powder is fused by the laser beam, said powder and the already produced part of the component 10 are strongly heated. In order to prevent any cracking due to temperature gradients, the device has an induction coil 2, by means of which the component 10 can be heated inductively in regions during its manufacture. To this end, the induction coil 2 is connected to a resonant circuit 3 (ultimately a capacitor) in an electrically conductive manner and an alternating voltage is applied to it.

In order to be able to adjust the position of the induction coil 2 in relation to the component 10 to an inductive coupling that is as good as possible, the induction coil 2 is guided movably in relation to the powder bed holder 1. The induction coil 2 is arranged at a mobile part 4, namely a first carriage, which can move on a first rail as guide part 5 along a first track of movement 6. The first rail, on its part, is arranged at a second carriage 7, which can be guided on a second rail 8 so as to be shifted in position along a second track of movement 9.

The first track of movement 6 and the second track of movement 9 are perpendicular to each other and the induction coil 2 can be moved over the surface of the powder bed holder 2. As is highlighted on the basis of the figures, in particular, a special feature of the bearing is that it mediates an electrical contact at the same time. As a result, no separate electrical connection is necessary for electrical connection of the induction coil 2 and the resonant circuit 3; in particular, no flexible copper cable or braid is necessary and this can help to increase the service life. Reference is also made explicitly to the embodiments and stated advantages in the introduction of the description.

Figure 2:
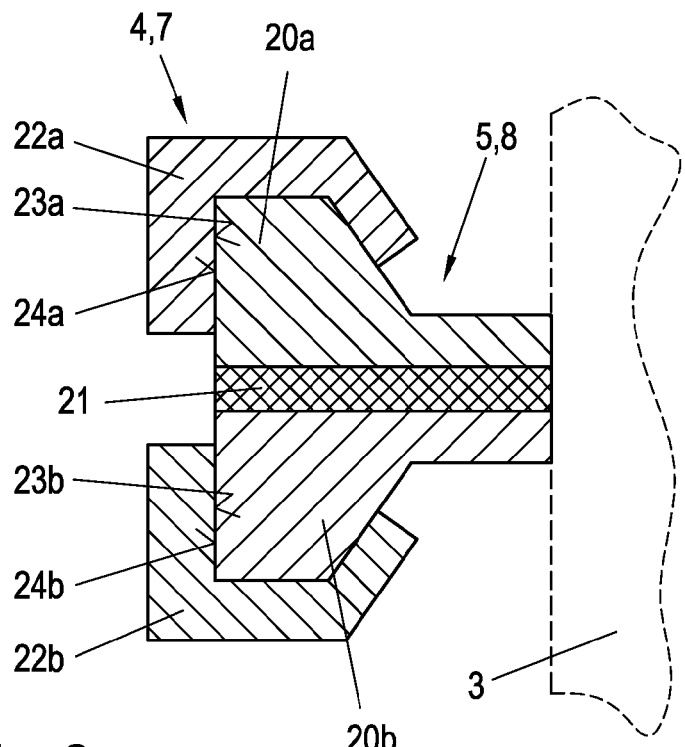
FIG. 2 is a first possibility for the design of the rail system of the device according to FIG. 1 in a schematic cut.

FIG. 2 shows the movement and guide parts 4, 5, that is, the first rail and the first carriage, in a cut, namely in a sectional plane lying perpendicular to the second track of movement 6. The second rail 8 and the second carriage 7 are analogous in construction (FIG. 2 therefore illustrates them as well, with the dashed part in FIG. 2 showing the mounting of the second rail 8 at the resonant circuit 3). Each rail has two conductor parts 20a, b, which are electrically insulated from each other via an insulator 21 arranged between them. The respective carriage has two contact elements 22a, b, one of which rests with a contact surface 23a against the surface of a contact surface 24a of the conductor part 20a. Similarly, the second contact element 22b rests with a contact surface 23b against the surface of a support area 24b of the second conductor part 20b.

Thus, each contact element 22a, b is connected to the respective conductor part 20a, b in an electrically conductive manner via the respective contact area against which the contact surfaces 23a, 24a; 23b, 24b each rest against one another. At the same time, the contact areas serve as a gliding surface; that is, the respective carriage is guided over them on the respective rail in the form of a sliding bearing. The second rail 8 is fastened at the resonant circuit 3 (the dashed part shown applies only to the second rail 8).

The first rail is arranged at the second carriage 7 (not illustrated; the conductor parts thereof are each connected to a respective contact element of the second carriage). In the case of the first carriage, each of the contact elements 22a, b is connected to an electrode of the induction coil 2 (likewise not illustrated).

Figure 3:
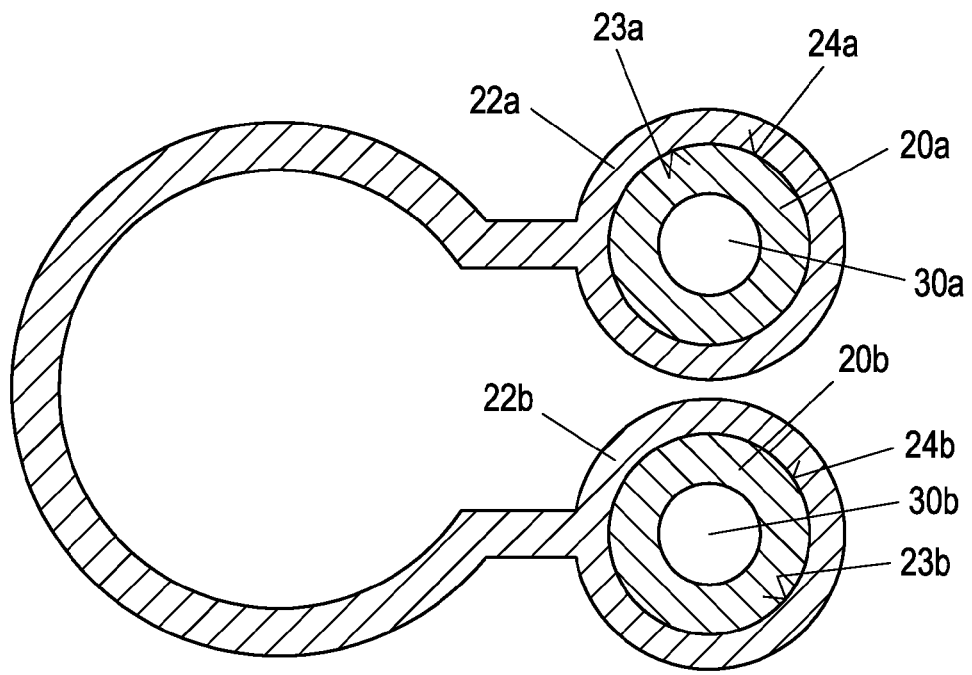
FIG. 3 is a second possibility for the design of the rail system of the device according to FIG. 1 in a schematic cut.

FIG. 3 shows an alternative possibility for the design of carriages and rails, once again in a cut lying perpendicular to the track of movement. In this case, the conductor parts 20a, b of the rail are designed as relatively thick-walled hollow tubes, the respective outer sleeve surfaces of which form the respective contact surfaces 24a, b. Illustrated in FIG. 3 is the first carriage, at the contact elements 22a, b of which the induction coil 2 is connected (the carriage and the induction coil are illustrated here as a continuous part for simplicity). On the inner side in each case, the conductor parts 20a, b delimit a respective empty volume 30a, b, in which a coolant can be conveyed. Corresponding cooling channels would also be possible for the embodiment according to FIG. 2.

Figure 4:
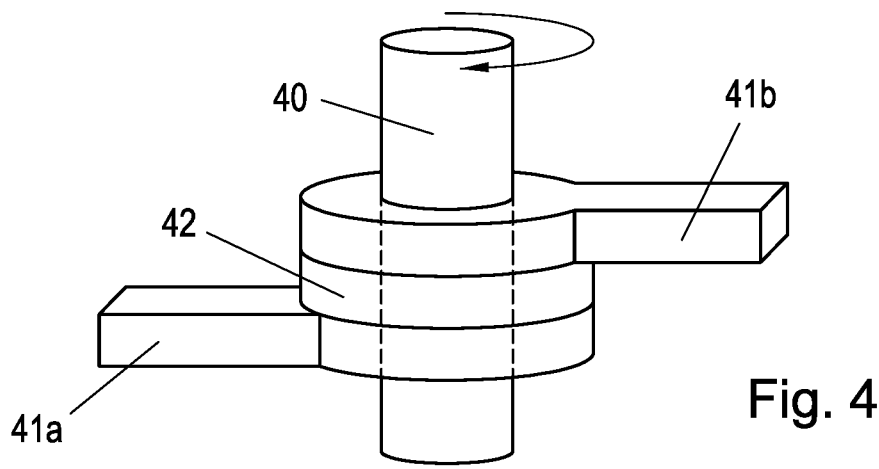
FIG. 4 is a possibility for the design of a pivot bearing for exactly one electrical lead.
Figure 5:
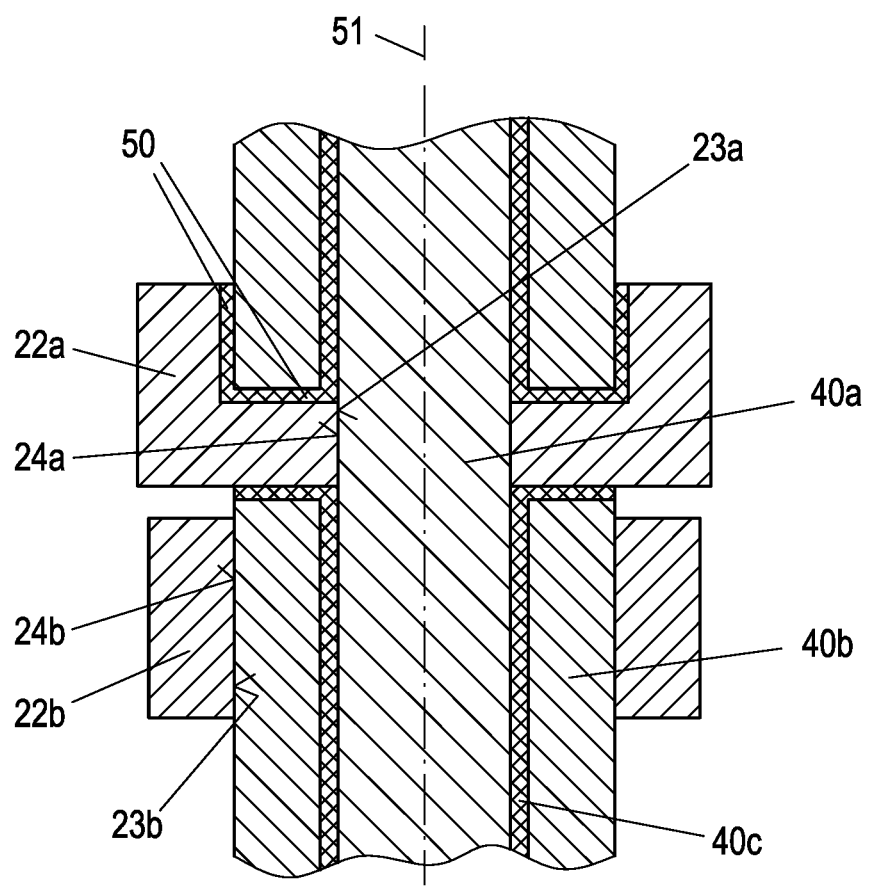
FIG. 5 is a possibility for the design of a pivot bearing for two electrical leads.

Shown in the case of FIG. 1 is an arrangement with two rails, although, in a simple case, it would also be possible to provide only a single rail and fasten it, for example, at the resonant circuit 3. In addition, for example, a combination of a linear bearing with a rail guide and a pivot bearing is also possible. FIGS. 4 and 5 illustrate how the concept according to the invention, namely the integration of electrical contact area and mechanical sliding surface, could be realized for pivot bearings.

The pivot bearing according to FIG. 4 has a metallic solid cylinder as axis 40. Arranged at the axis 40 are a first rotating conductor 41a and a second rotating conductor 41b, which are connected to each other in an electrically conductive manner via the axis 40, which overall represents a conductor part. The rotating conductors 41a, b can be twisted around the axis 40 in relation to each other. In the present case, an axial insulator 42 is arranged in between so as, for example, to optimize the mechanical friction. However, an analogous embodiment without an axial insulator 42 is just as conceivable, for which the rotating conductors 41a, b then rest directly against each other (the axis 40 need then not necessarily be electrically conductive). Such a rotating conductor could then, for example, be utilized as a rail, guide a carriage linearly on it so as to shift the carriage in position, or else itself carry the induction coil directly.

FIG. 5 illustrates a pivot bearing, over which two electrical leads are guided. Shown is a cut in a sectional plane that includes the axis of rotation. The axis 40 has a core part 40a, namely a metallic solid cylinder. Arranged radially outside of it is a likewise metallic sleeve part 40b, with the core part 40a and the sleeve part 40b being insulated from each other via an insulator 40c. The core part 40a forms a first conductor part and the sleeve part 40b forms a second conductor part.

A carriage is arranged rotatably on the axis 40 and has a first contact element 22a, which rests with a contact surface 23a against a contact surface 24a of the core part 40a. To this end, the first contact element 22a passes radially through the sleeve part 40b, with respect to which it is electrically insulated axially and at its outer side via an insulator 50. The second contact element 22b of the carriage rests with its contact surface 23b against the contact surface 24b of the sleeve part 40b. The induction coil 2 could then be fastened directly, for example, at the rotatably guided contact elements 22a, b or a rail, on which the induction coil 2 is then guided axially so as to be shifted in place, could be fastened. The illustrated part is rotationally symmetric around the axis of rotation 51.

The invention claimed is:

1. An induction device for inductive heating of a component, comprising:
    a component placement unit for the component;
    an induction coil, with which the component can be heated inductively, at least in regions;
    an electrical lead for the induction coil; and
    a positioning unit, at which the induction coil is arranged in such a way that it can be brought into different relative arrangements by the positioning unit with respect to the component placement unit;
    wherein the electrical lead is guided over a contact, which is formed by contact surfaces that rest against each other and are shifted in position in relation to each other in a contact position when the induction coil is shifted in position by means of the positioning unit.

2. The induction device according to claim 1, wherein the positioning unit has a guide part and a mobile part movably guided on it, at which mobile part the induction coil is arranged and can be brought into the different relative arrangements with respect to the component placement unit by the guided movement.

3. The induction device according to claim 2, wherein the mobile part is guided movably over a sliding bearing at the guide part.

4. The induction device according to claim 3, wherein a contact area of the contact, at which the contact surfaces rest against each other, and a sliding surface of the sliding bearing, at which the guide part and the mobile part are supported against each other, coincide at least partially.

5. The induction device according to claim 4, wherein one of the mobile or guide parts is an axis, at which the mobile part and the guide part are guided so as to be rotatable with respect to each other over a range of rotational angles, with the axis having a conductor part over the range of rotational angles, which is part of the electrical lead and forms one of the contact surfaces of the contact.

6. The induction device according to claim 4, wherein at least one of the mobile or guide parts is a rail, at which the mobile part and guide part are guided so as to be shifted in place with respect to each other along a track of movement, with the rail having a conductor part along the track of movement, which is part of the electrical lead and forms one of the contact surfaces of the contact.

7. The induction device according to claim 6, wherein the movement part and the guide part are the rail and a carriage guided on it, with the carriage having a contact element, which is part of the electrical lead and forms the other one of the contact surfaces.

8. The induction device according to claim 7, wherein the carriage at least partially embraces the rail in a sectional plane lying perpendicular to the track of movement.

9. The induction device according to claim 7, wherein the carriage is the mobile part, at which the induction coil is arranged, and is connected to the contact element of the carriage in an electrically conductive manner.

10. The induction device according to claim 6, wherein the rail is guided rotatably in relation to the component placement unit via a sliding bearing, with a sliding surface of the sliding bearing forming, at the same time, a contact, over which the electrical lead is guided.

11. The induction device according to claim 6, having a second rail in addition to the first rail, wherein the first rail and the second rail can move with respect to each other along a second track of movement, which lies at an angle to the first track of movement, and the second rail has a conductor part along the second track of movement, said conductor part forming a contact surface of a second contact, via which the conductor part of the first rail and the conductor part of the second rail are connected to each other in an electrically conductive manner.

12. The induction device according to claim 1, wherein the induction device is configured for the additive manufacture of a component from a powder bed, having
 a source for irradiation of the powder bed and thus solidification for a layer-by-layer buildup of the component;
 wherein the component placement unit is designed as a powder bed holder for holding the powder bed, and the component can be heated inductively with the induction coil, at least in regions, during the layer-by-layer buildup.

13. The induction device according to claim 12 further including a coater, which can be moved over the powder bed holder for layer-by-layer application of the powder bed, wherein a rail is fastened to a guide of the coater or to the coater itself and, in fact, is guided movably or fixed in position in relation to the coater.

14. The induction device according to claim 12, having a second induction coil for inductive heating of the component, at least in regions, during the layer-by-layer buildup, wherein the second induction coil is arranged at a second positioning unit in such a way that it can be brought into different relative arrangements with respect to the powder bed holder by the second positioning unit, wherein an electrical lead of the second induction coil is guided over a second contact, which is formed by contact surfaces that rest against each other, and said contact surfaces are shifted in position in relation to each other into the different relative arrangements in the contact position when the second induction coil is shifted in position by means of the second positioning unit.

15. The induction device according to claim 1, wherein the induction coil is brought into different relative arrangements with respect to the powder bed holder by the positioning unit,
 wherein, when the induction coil is shifted in place into different relative arrangements by means of the positioning unit, the contact surfaces of the contact, which rest against each other in the contact position, are shifted in place in relation to each other.

\* \* \* \* \*